United States Patent
Bellanger et al.

(10) Patent No.: US 12,441,454 B2
(45) Date of Patent: Oct. 14, 2025

(54) HEAT SHIELD PROVIDED WITH PROTECTIVE LAYERS, IN PARTICULAR FOR A PART OF AN AIRCRAFT

(71) Applicant: AIRBUS OPERATIONS (SAS), Toulouse (FR)

(72) Inventors: Alexandre Bellanger, Toulouse (FR); Arnaud Tonnele, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 189 days.

(21) Appl. No.: 18/071,127

(22) Filed: Nov. 29, 2022

(65) Prior Publication Data
US 2023/0166829 A1    Jun. 1, 2023

(30) Foreign Application Priority Data
Nov. 30, 2021 (FR) .................................. 2112697

(51) Int. Cl.
| | | |
|---|---|---|
| *B64C 1/40* | (2006.01) | |
| *B32B 5/02* | (2006.01) | |
| *B32B 5/18* | (2006.01) | |
| *B32B 7/12* | (2006.01) | |
| *B32B 15/04* | (2006.01) | |

(52) U.S. Cl.
CPC .............. *B64C 1/40* (2013.01); *B32B 5/028* (2013.01); *B32B 5/18* (2013.01); *B32B 7/12* (2013.01); *B32B 15/046* (2013.01); *B32B 2250/02* (2013.01); *B32B 2250/44* (2013.01); *B32B 2307/302* (2013.01); *B32B 2307/304* (2013.01); *B32B 2307/3065* (2013.01); *B32B 2605/18* (2013.01)

(58) Field of Classification Search
None
See application file for complete search history.

(56) References Cited

U.S. PATENT DOCUMENTS

| | | | | |
|---|---|---|---|---|
| 5,804,306 | A * | 9/1998 | Sorenson | B32B 18/00 428/317.1 |
| 10,239,601 | B2 * | 3/2019 | Landais | B64C 1/40 |
| 10,434,755 | B2 * | 10/2019 | Fernando | B32B 7/12 |
| 10,498,125 | B2 * | 12/2019 | Aspas Puertolas | B64D 45/02 |
| 11,664,647 | B2 * | 5/2023 | Sang | B32B 27/26 174/2 |
| 2012/0276368 | A1 | 11/2012 | Fernando et al. | |
| 2018/0043983 | A1 | 2/2018 | Landais et al. | |

FOREIGN PATENT DOCUMENTS

EP          3 636 427          4/2020

OTHER PUBLICATIONS

Search Report for FR2112697, dated Jun. 22, 2022, 2 pages.

* cited by examiner

*Primary Examiner* — Daniel J. Schleis
(74) *Attorney, Agent, or Firm* — Nixon & Vanderhye P.C.

(57) ABSTRACT

A heat shield for protecting a part of an aircraft is disclosed including superposed layers providing thermal protection, and one or more layers providing fire protection. The heat shield also may include other layers implementing other functions.

13 Claims, 3 Drawing Sheets

HEAT SHIELD PROVIDED WITH PROTECTIVE LAYERS, IN PARTICULAR FOR A PART OF AN AIRCRAFT

CROSS REFERENCE TO RELATED APPLICATION

This application claims priority to and incorporates by reference the entirety of French Application Number FR 2112697, filed Nov. 30, 2021.

BACKGROUND

The present disclosure relates to a heat shield, and more specifically, a heat shield for a part of an aircraft.

Although not exclusively, the present disclosure applies more particularly to the creation of a heat shield in the region of a fuel tank of an aircraft. It is known that certain aircraft, such as, in particular, transport airplanes, have tanks situated in a part of the fuselage of the aircraft, into which the fuel is directly introduced. By way of illustration, this may be a rear central tank of a transport airplane.

In this case, the structure of the aircraft needs to comply with very strict conditions in the event of fire outside the aircraft; in particular, the fire must not pass through the structure of the aircraft and the temperature at the internal surface of the fuselage must not exceed a predetermined temperature, generally around 200° C.

A part of the fuselage is generally protected by a belly fairing. However, this belly fairing does not, in general, completely cover the external part of the fuselage in the region of the tank.

There is therefore a need for a solution that makes it possible to confer protection on a part of the fuselage of an aircraft, in particular in the region of a fuel tank, which makes it possible to comply with the required conditions mentioned above.

SUMMARY

The present disclosure relates to a heat shield, in particular for a part of an aircraft, and in particular a part of the fuselage of the aircraft in the region of a fuel tank, making it possible to meet this need.

To this end, according to the disclosure, the heat shield has a plurality of superposed layers comprising at least one layer providing thermal protection and one layer providing fire protection.

Thus, by virtue of the disclosure, and as specified further below, a heat shield is obtained that simultaneously provides thermal protection and fire protection, as is required in the envisioned applications. In addition, by virtue of its production in superposed layers, the heat shield may be easily adapted to the required characteristics, in particular by adapting the number and/or the characteristics of the layers, as is also specified below.

The heat shield has further advantages that are set out below.

In a first version of a first embodiment, the heat shield has at least one stack of layers that is configured to provide at least fire protection and also a layer of foam or an air gap configured to provide thermal protection, the stack of layers being joined to the layer of foam or the air gap.

Advantageously, the stack of layers has a first set of superposed layers made from a first material, the first set of layers providing fire protection and thermal protection, and second and third sets of superposed layers made from a second material. In addition, advantageously, the second and third sets are identical and are arranged, respectively, on either side of the first set. In addition, advantageously, at least one of the layers is made from one of the following materials: glass, titanium, ceramic, a carbon-based material.

Furthermore, in a second version of the first embodiment, the heat shield has a titanium layer configured to provide fire protection and also a layer of foam or an air gap configured to provide thermal protection.

Furthermore, in a second embodiment, the plurality of layers of the heat shield comprises at least one layer that is able to simultaneously provide thermal protection and fire protection. Advantageously, the layer is made of ceramic.

Furthermore, advantageously, the heat shield has a plurality of superposed layers that are able to simultaneously provide thermal protection and fire protection.

Furthermore, in one particular embodiment, the heat shield has at least one layer provided with a metal lattice, which lattice may be pre-impregnated.

Advantageously, the heat shield also has an external protective layer, in particular so as to protect the layer provided with the metal lattice.

The present disclosure also relates to an aircraft part, in particular a part of the fuselage of the aircraft, in particular in the region of a fuel tank of the aircraft, which has at least one heat shield such as the one described above, which is adhesively bonded to a face (which may be external) of the aircraft part.

The present disclosure also relates to an aircraft, in particular a transport airplane. According to the disclosure, the aircraft has at least one heat shield such as the one described above, which is adhesively bonded to a face of a part of the aircraft and/or at least one aircraft part such as the one described above.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures.

Figure 1:
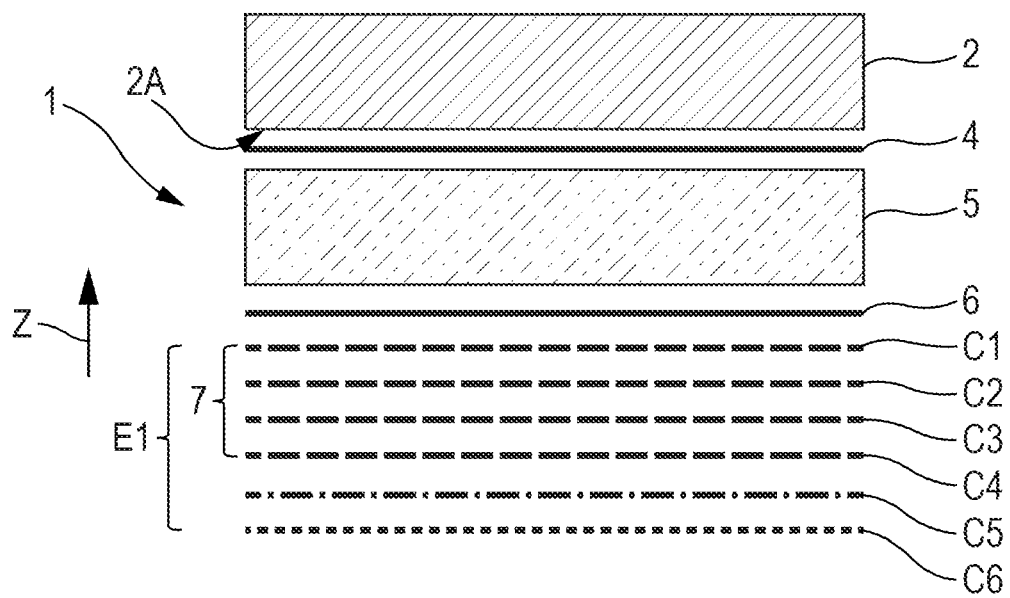
FIG. 1 is a schematic, exploded and cross-sectional view of a heat shield, adhesively bonded to a structural part, according to a first version of a first embodiment comprising a layer of foam.
Figure 2:
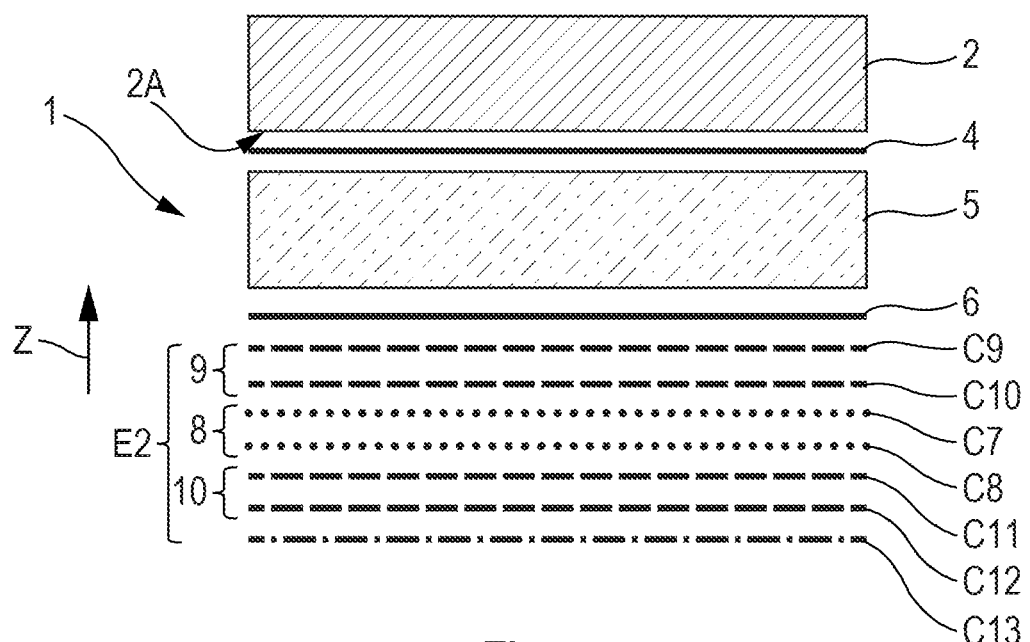
FIG. 2 is a schematic, exploded and cross-sectional view of a heat shield, adhesively bonded to a structural part, according to a second version of the first embodiment.
Figure 3:
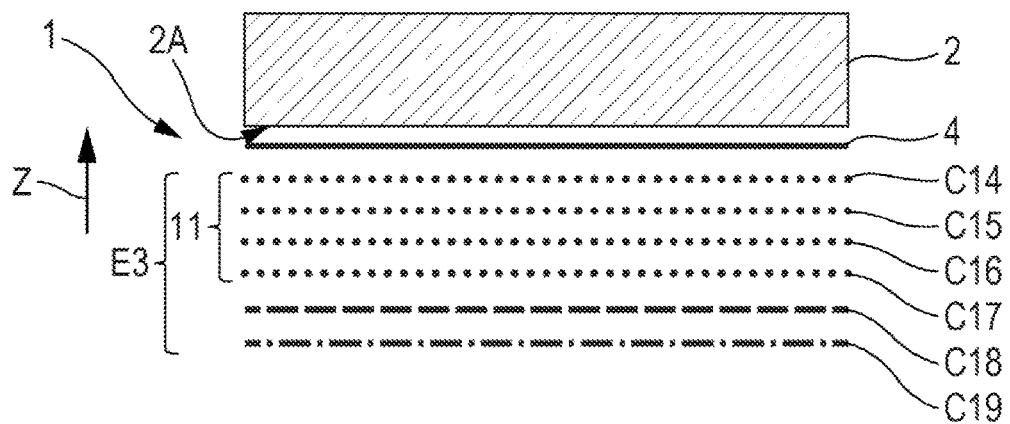
FIG. 3 is a schematic, exploded and cross-sectional view of a heat shield, adhesively bonded to a structural part, according to a second embodiment.
Figure 4:
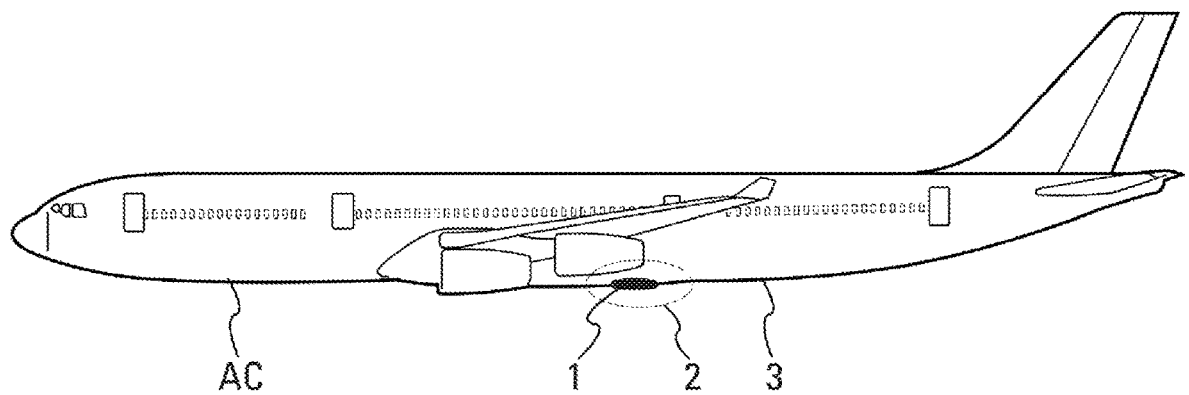
FIG. 4 is a schematic side view of an aircraft provided with a heat shield.
Figure 5:
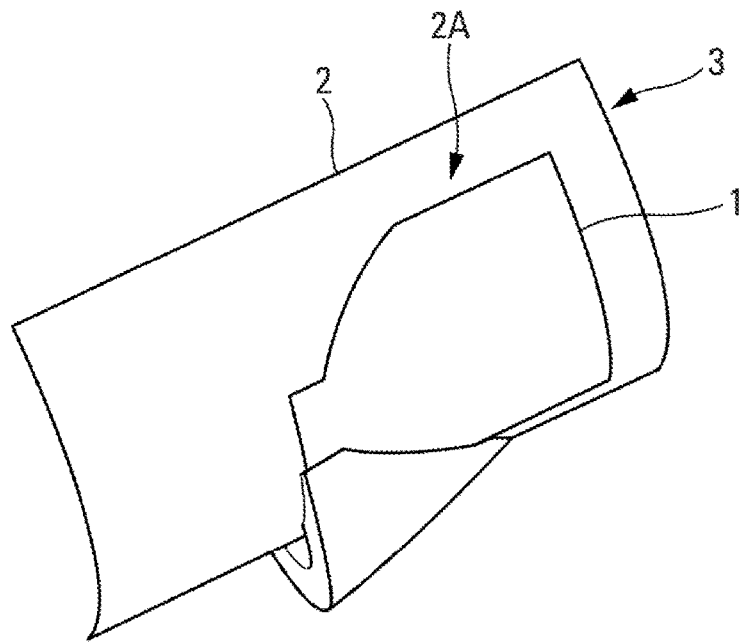
FIG. 5 is an enlarged, perspective, schematic, and partial view of a part of the aircraft in FIG. 4, which is provided with a heat shield.

The heat shield 1 that is shown schematically in different embodiments in FIGS. 1 to 3 and illustrates an exemplary embodiment that is intended to be mounted on a structural part 2 to be protected as specified above. This part 2 may be a part of an aircraft AC, in particular of a transport airplane, as shown in FIGS. 4 and 5.

In an exemplary embodiment, the part 2 of the aircraft AC (encircled in FIG. 4 and shown in perspective in FIG. 5), which is intended to receive the heat shield 1, is a part of the fuselage 3 of the aircraft AC, in particular in the region of a fuel tank (not shown).

The part of the aircraft AC that is intended to receive the heat shield 1 may correspond to any part of the aircraft AC that needs to be particularly protected against fire and heat. The heat shield 1 may also be applied to a structural part of a system or machine (in particular a mobile machine) other than an aircraft.

According to the exemplary embodiment, the heat shield 1 has, as specified below, a plurality of superposed layers comprising at least one layer providing thermal protection and one layer providing fire protection.

What is meant by:
thermal protection is protection that makes it possible to ensure that the temperature at a surface (facing away from the one subjected to a heat source) of the part 2 to be protected does not exceed a predetermined temperature, generally around 200° C.; and
fire protection is protection that makes it possible to prevent fire from passing through the part 2.

In order to provide these types of protection, the heat shield 1 is intended to be fixed to the part 2 of the aircraft AC, and generally to an external face 2A of this part 2. In an exemplary embodiment, the shield 1 is adhesively bonded to the external face 2A of the part 2 via an appropriate adhesive 4. By way of non-limiting example, the adhesive 4 (FIGS. 1 to 3) may correspond to one of the following adhesives: a silicone mastic, a so-called sealant mastic, or an epoxy-based adhesive. Adhesive bonding thus makes it possible to avoid heat transmission.

The heat shield 1 is arranged on the outside of the part 2 of the aircraft AC. FIGS. 1 to 3 show an arrow Z pointing from the outside toward the inside. In the rest of the description, "internal" and "inside" are understood in the direction indicated by the arrow Z and "external" and "outside" in the opposite direction.

In a first embodiment, shown in FIGS. 1 and 2, the heat shield 1 has a layer of foam 5 configured to provide fire protection. In one variant (not shown), the heat shield 1 may have an air gap in place of the layer of foam 5.

The heat shield 1 also has a stack of layers E1, E2. What is meant by stack of layers is a succession of superposed layers. This stack of layers E1, E2 is configured to provide at least fire protection.

In FIGS. 1 to 3, for the sake of simplicity of the drawing, the layers are shown in an exploded view, separated from one another in the direction Z. Of course, the various elements that are shown in these FIGS. 1 to 3, and that follow one another directly, are in contact with one another in the direction Z.

The stack of layers E1, E2 is joined to the layer of foam 5 with adhesive bonding, via an appropriate adhesive 6. The adhesive 6 may correspond in particular to one of the following adhesives: a silicone mastic or an epoxy-based adhesive. In the case of an air gap, the stack of layers may be joined to the air gap with fixing with nuts or bolts.

Within the context of the claimed subject matter, the stack of layers E1, E2 may be realized in various ways. In particular, it may have a variable number of layers and also layers of different materials, in particular so as to implement different functions, as specified below.

In a first version (shown in FIG. 2) of this first embodiment, the stack of layers E1 has a set 7 formed of a plurality of superposed layers, for example made of glass or carbon, which is intended to realize fire protection. In the example in FIG. 1, the set 7 has four superposed layers C1, C2, C3 and C4.

The stack of layers E1 also comprises a layer C5 provided with a metal lattice (or network) providing electrical conductivity. This metal lattice is intended to channel, in the usual way, the electric currents that are liable to appear in the part 2, for example electric currents generated by lightning. The layer C5 covers the set 7 toward the outside.

The heat shield 1 also has an external protective layer C6. This external protective layer C6, which is made for example of glass, is arranged on the external face of the layer C5 provided with the metal lattice and is intended to protect this layer C5.

In an embodiment variant (not shown) the layer C5 and the protective layer C6 may be replaced by a single layer provided with a pre-impregnated metal lattice. In this case, the layer comprises a resin impregnating the metal lattice.

Furthermore, in a second version (shown in FIG. 2) of this first embodiment, the stack of layers E2 has a set 8 of superposed layers C7 and C8. The layers C7 and C8 are made from a first material, for example ceramic. This set 8 is configured to provide fire protection and also thermal protection.

The stack of layers E2 also has a set 9 of superposed layers C9 and C10. The layers C9 and C10 are made from a second material, for example glass. This set 9 that is arranged on the internal face of the set 8 is, in particular, intended to provide additional fire protection and also stiffness to the heat shield 1, in particular so as to make it easier to handle and avoid deformation.

The stack of layers E2 also has a set 10 of superposed layers C11 and C12. The layers C11 and C12 may be made from the same material as the layers C9 and C10 of the set 9. This set 10 that is arranged on the external face of the set 8 is intended to provide additional fire protection and also stiffness to the heat shield and provide protection against various types of potential damage.

In the exemplary embodiment shown in FIG. 2, the sets 9 and 10 are identical and make it possible, as they are arranged, respectively, on either side of the set 9 (toward the inside and toward the outside), to obtain an assembly of layers C7 to C12 that is substantially symmetrical, and this avoids deformation during manufacturing (curing) thereof and makes it easier to handle.

Furthermore, the stack of layers E2 also has a layer C13 provided with a metal lattice providing electrical conductivity. This metal lattice is intended to channel, in the usual way, the electric currents that are liable to appear in the part 2, for example electric currents generated by lightning. In this example, the layer C13 is provided with a pre-impregnated metal lattice, i.e. it comprises a resin impregnating the metal lattice. The layer C13 covers the set 10 towards the outside.

In an embodiment variant (not shown), the layer C13 provided with a pre-impregnated metal lattice may be replaced by two layers similar to the layers C5 and C6 in FIG. 1.

In a particular version (not shown) of the first embodiment mentioned above (comprising a layer of foam or an air gap for thermal protection), it is possible to provide, for the fire protection, a single layer of titanium, instead of the stack of layers E1, E2.

Furthermore, in a second embodiment shown in FIG. 3, the heat shield 1 has a stack of layers E3. This stack of layers E3 comprises a set 11 of superposed layers C14, C15, C16 and C17. Each of the layers C14, C15, C16 and C17 is simultaneously able to provide thermal protection and fire protection. These superposed layers C14, C15, C16 and C17 are made from the same material, for example ceramic. In a variant that is not shown, the superposed layers C14, C15, C16 and C17 may be made from different materials.

This second embodiment in FIG. 3 does not require the use of a foam (like the first embodiment described above with reference to FIGS. 1 and 2) to provide thermal protection. This makes it possible, in particular, to reduce the thickness of the heat shield 1.

The stack of layers E3 comprises, in addition, a layer C18, for example made of glass, intended to realize mechanical protection. The layer C18 covers the set 11 toward the outside.

Furthermore, the stack E3 of layers also comprises a layer C19 provided with a metal lattice. The layer C19 covers the layer C18 toward the outside. In this example, the layer C19 is provided with a pre-impregnated metal lattice and is, for example, similar to the layer C13 in FIG. 2.

In an embodiment variant (not shown), the layer C19 may be replaced by two layers similar to the layers C4 and C5 in FIG. 1.

In the context of the claimed subject matter, the layers of the heat shield 1 can be made of different materials. In an exemplary embodiment, at least one layer, in particular those intended to provide fire protection and potentially thermal protection, are made from one of the following materials: glass, titanium, ceramic, a carbon-based material.

Consequently, whatever the embodiment under consideration, a heat shield 1 is obtained that simultaneously provides thermal protection and fire protection, as is required in the envisioned applications.

In addition, by virtue of its production in superposed layers, the heat shield 1 may be easily adapted to the required characteristics, in particular by adapting the number and/or the characteristics of the layers. In particular, depending on the envisioned application, it is possible to provide one or more additional layers that are able to provide specific types of protection or functions, other than thermal protection and fire protection, such as for example the layers C5, C13 and C19 of which the function is to channel electric currents.

Furthermore, it is known that, for a structure formed of an assembly of layers, which is intended to provide fire protection and/or thermal protection, the level of protection increases with the thickness of the assembly. Thus, by virtue of the production in superposed layers, it is possible to easily adapt the number of layers in order to obtain the appropriate overall thickness for providing the one or more desired types of protection.

There follows an explanation of exemplary methods for manufacturing the heat shield 1 as described above.

In order to manufacture the heat shield 1 according to the first embodiment, as shown in FIGS. 1 and 2, a first manufacturing method is used. This first manufacturing method comprises a first step consisting, first of all, in manufacturing a composite panel formed of the stack of layers E1, E2. To this end, the various layers of the stack of layers E1, E2 are placed in a mold and curing is performed in the usual way. In the context of the claimed subject matter, any usual method for producing a composite panel from such a stack of layers can be used to implement this first step. The composite panel can also have, as a variant, a single layer of titanium.

This first manufacturing method also comprises a second step consisting in adhesively bonding, in the usual way, the composite panel thus formed to the layer of foam 5 using the adhesive 6, for example a silicone mastic or an epoxy-based adhesive, or in joining it to the air gap with fixing with nuts or bolts.

Furthermore, in order to manufacture the heat shield according to the second embodiment, as shown in FIG. 3, a second manufacturing method is used. This second manufacturing method consists in manufacturing a composite panel formed of the stack of layers E3. To this end, the various layers of the stack of layers E3 are placed in a mold and curing is performed in the usual way. In the context of the claimed subject matter, any usual method for producing a composite panel from such a stack of layers can be used to implement this second manufacturing method.

The heat shield 1, manufactured according to either one of the first and second manufacturing methods mentioned above, is fixed with adhesive bonding, using the adhesive 4, for example a silicone mastic, a so-called sealant mastic or an epoxy-based adhesive, via its internal surface, to the external face 2A of the part 2 of the aircraft AC. The adhesive may be applied to the entire internal surface of the heat shield 1. In an embodiment variant, it is also conceivable to provide the adhesive bonding only on one or more zones of the internal surface of the heat shield 1 and not on this entire internal surface.

Fixing with adhesive bonding has the advantage of not reducing the thermal protection created by the heat shield 1. This is because it avoids, in particular, the use of fixing elements such as rivets or bolts that pass all the way through and conduct heat, and that would reduce the thermal protection properties if they were used for fixing purposes.

In a first embodiment, the heat shield 1 is only fixed with adhesive bonding, with the aid of the adhesive 4, to the external face 2A of the part 2.

Figure 6:
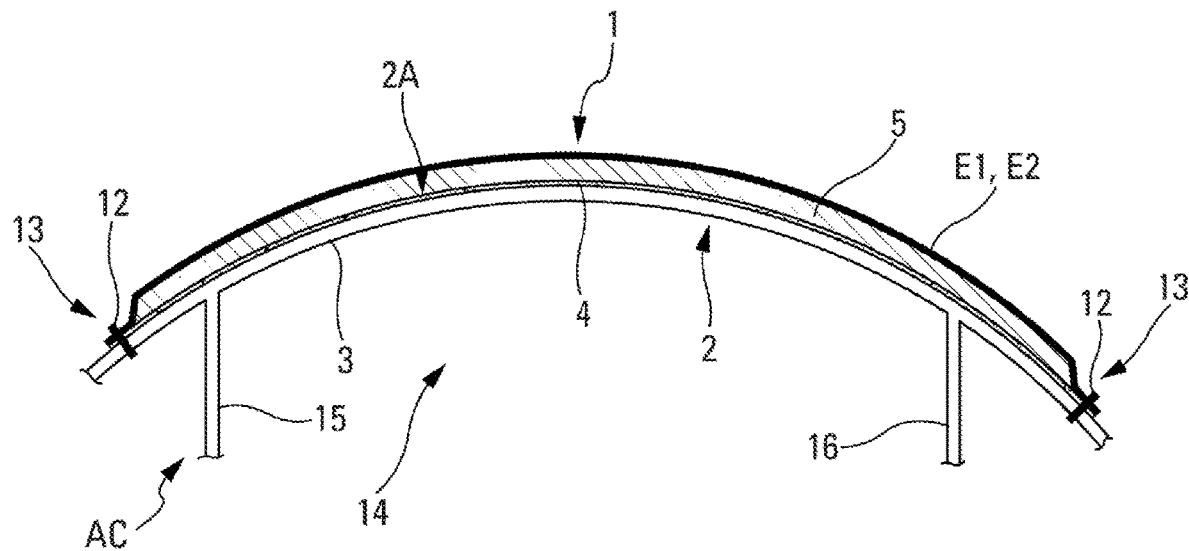
FIG. 6 is a partial, cross-sectional view of a part of an aircraft fuselage, provided with a heat shield.

Moreover, in a second embodiment shown in FIG. 6, in addition to adhesive bonding as is implemented in the first embodiment, additional fixing is provided. This additional fixing may be realized, for example, by fixing elements 12 such as rivets or bolts. This fixing may only be realized at successive fixing points situated outside the zone to be protected, along a line provided close to the periphery of the heat shield.

In an exemplary embodiment, as shown in FIG. 6, the heat shield 1 has a surface that completely covers the part to be protected and extends beyond this part to be protected with a so-called peripheral zone 13, and the additional fixing is realized in this peripheral zone 13.

This additional fixing makes it possible to always keep the heat shield 1 joined to the part 2, if, for some reason, the adhesive bonding loses its effectiveness.

As indicated above, in an exemplary embodiment, the part 2 of the aircraft AC that is protected by the heat shield 1 is a part of the fuselage 3 of the aircraft AC in the region of a fuel tank 14, as shown in FIG. 6, and in particular a part 2 of the fuselage 3 that is not protected by a belly fairing. If necessary, the heat shield may be adhesively bonded at at least one of its ends to a belly fairing (not shown).

FIG. 6 partially shows side walls 15 and 16 of the fuel tank 14, the fuel tank 14 being situated between these side walls 15 and 16. In this example, the shield 1 corresponds to that of the first embodiment, comprising the stack of layers E1 or E2 that is adhesively bonded (by an adhesive that is not shown) to the layer of foam 5. The shield 1 could also correspond to another embodiment and in particular to the second embodiment (without the layer of foam). The shield 1 has a surface that completely covers the part to be protected, namely the part of the fuselage 3 between the side walls 15 and 16, and that extends beyond this part to be protected, toward the outside of the fuel tank 14 and therefore the side walls 15 and 16, in the peripheral zone 13. The additional fixing is realized in this peripheral zone 13 with the aid of the fixing elements 12 that pass all the way through. These fixing elements 12 that pass all the way through and are liable to weaken the thermal protection are therefore situated outside the zone to be protected.

In the example in FIG. 6, the stack of layers E1 or E2 has a surface that completely covers the layer of foam 5 and extends beyond this layer of foam 5. The additional fixing is realized in the peripheral zone 13 that comprises only the stack of layers E1 or E2.

In the context of the claimed subject matter, the part of the aircraft AC that is intended to receive the heat shield 1 may correspond to any part of the aircraft AC that needs to be particularly protected against fire and heat.

Furthermore, the heat shield 1 may also be applied to a part of a system or of a machine other than an aircraft, which requires such protection.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heat shield for a part of an aircraft, consisting of:
a stack of layers consisting of a plurality of superposed layers, wherein at least one layer of said plurality of superposed layers providing thermal protection, and wherein another layer of said plurality of superposed layers providing fire protection,
a foam layer,
wherein the foam layer is attached to an external face of the aircraft part at one side,
and wherein the foam layer is attached to the at least one layer of said plurality of superposed layers at an opposing side using an adhesive.

2. The heat shield as claimed in claim 1, wherein the stack of layers has a first set of superposed layers made from a first material, the first set of layers providing fire protection and thermal protection, and second and third sets of superposed layers made from a second material.

3. The heat shield as claimed in claim 2, wherein the second and third sets are identical and are arranged, respectively, on either side of the first set.

4. The heat shield as claimed in claim 1, wherein at least one of the layers is made from one of the following materials: glass, titanium, ceramic, a carbon-based material.

5. The heat shield as claimed in claim 1, which has a titanium layer configured to provide fire protection and also a layer of foam or an air gap configured to provide thermal protection.

6. The heat shield as claimed in claim 1, wherein the plurality of layers comprises at least one layer that is able to simultaneously provide thermal protection and fire protection.

7. The heat shield as claimed in claim 6, wherein the superimposed layers are made of ceramic.

8. The heat shield as claimed in claim 6, wherein the plurality of superposed layers that are able to simultaneously provide thermal protection and fire protection.

9. The heat shield as claimed in claim 1, wherein the at least one layer is provided with a metal lattice.

10. The heat shield as claimed in claim 1, further comprising an external protective layer.

11. An aircraft part, comprising at least one heat shield as claimed in claim 1, which is adhesively bonded to a face of the aircraft part.

12. An aircraft, comprising at least one heat shield as claimed in claim 1, which is adhesively bonded to a face of a part of the aircraft.

13. A heat shield for a part of an aircraft, consisting of:
a stack of layers consisting of a plurality of superposed layers, wherein at least one layer of said plurality of superposed layers providing thermal protection, and wherein another layer of said plurality of superposed layers providing fire protection,
wherein the stack of layers is positioned spaced apart from an external face of the aircraft part at one side, and
wherein the stack of layers is attached to said external face of the aircraft part with nuts and bolts.

* * * * *